V. S. DURBIN.
PIPE COUPLING.
APPLICATION FILED FEB. 7, 1916.
1,221,707.
Patented Apr. 3, 1917.
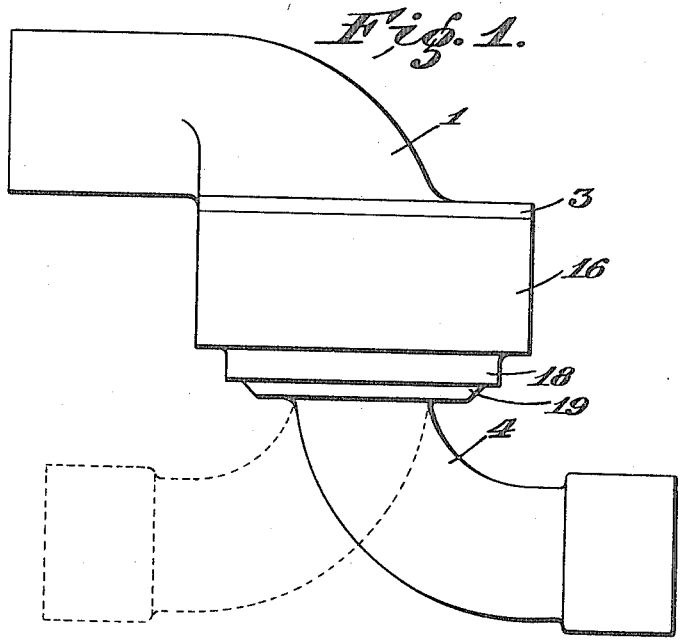
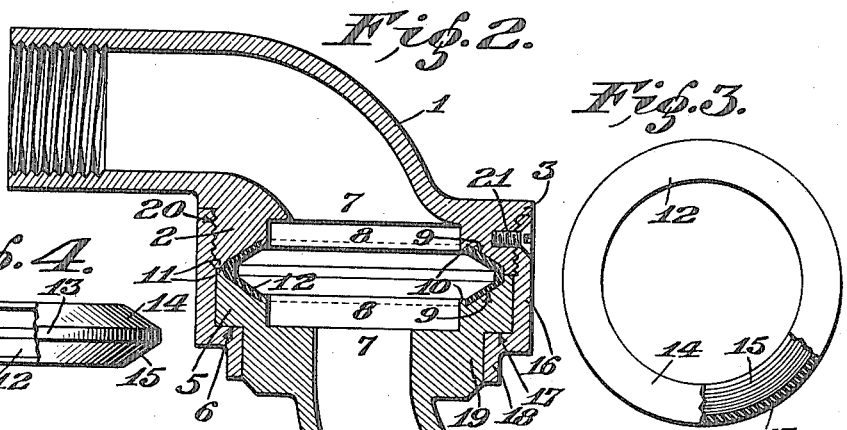
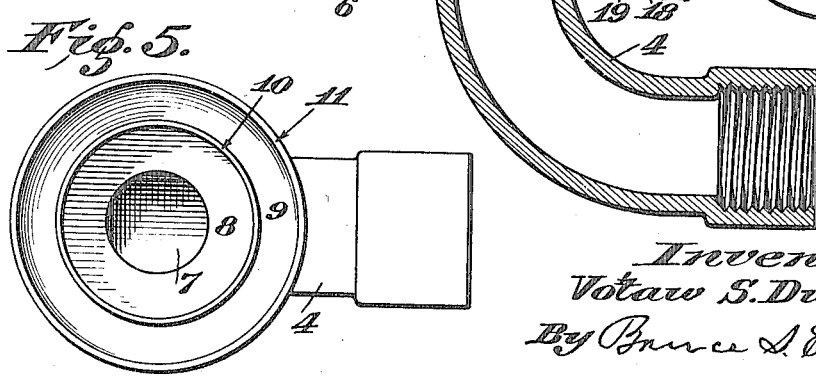
Inventor:
Votaw S. Durbin,
By Bruce S. Elliott
his Atty.

UNITED STATES PATENT OFFICE.

VOTAW S. DURBIN, OF ST. LOUIS, MISSOURI.

PIPE-COUPLING.

1,221,707.　　　　Specification of Letters Patent.　　Patented Apr. 3, 1917.

Application filed February 7, 1916. Serial No. 76,609.

*To all whom it may concern:*

Be it known that I, VOTAW S. DURBIN, a citizen of the United States, residing in the city of St. Louis and State of Missouri, have invented new and useful Improvements in Pipe-Couplings, of which the following is a specification.

This invention relates to certain new and useful improvements in couplings for pipes used for conveying compressed air, steam, or other gas or liquid under pressure, but it is equally applicable for use in coupling the ends of pipes adapted for conveying any gaseous or fluid medium under circumstances where it is desirable that a leak-proof joint be provided.

My invention is especially designed for use in connection with the air and steam pipes of trains; and its broad object is to provide a coupling of novel construction which shall be steam and air-tight, and which will be sealed more securely against leakage in proportion to the pressure of the air or steam passing through the coupling.

A further object of the invention is to provide a coupling possessing the characteristics described in which one member of the coupling shall be freely rotatable without in any manner impairing the leak-proof quality of the coupling.

A further object of the invention is to provide a novel construction of washer for use in sealing the meeting surfaces of the coupling, and which washer is specially designed to accomplish the secure sealing of the coupling against the escape of air or steam.

The invention is illustrated in the accompanying drawing, in which—

Figure 1 is a view in side elevation of my improved coupling and showing by dotted lines one of the coupling members turned to a different position;

Fig. 2 is a central vertical sectional view of the coupling;

Fig. 3 is a plan view, partly in section, of the improved washer used in connection with my coupling;

Fig. 4 is an edge view of the washer, and showing a portion thereof in section; and Fig. 5 is an inside view of one of the coupling members showing the seat for the washer.

Referring, now, to the drawing, the numeral 1 indicates a coupling member consisting of a head 2 having a substantially cylindrical wall and side face, and this head at its base is provided with an annular shoulder 3. The numeral 4 indicates a similar companion coupling-member which is provided with a circular head 5 having a reduced portion affording an annular shoulder 6. The heads 2 and 5 are constructed identically the same at their meeting sides, and a description of one will suffice for both. This construction is illustrated in Fig. 5, from which it will be seen that the opening 7 leading into the head is surrounded by an annular space 8, and this space is, in turn, surrounded by a recess 9 having an inclined bottom which provides at its opposite edges shoulders 10 and 11, respectively. The shoulder 11 is, in effect, the meeting face of the head, and with the shoulder 10 serves to define a recess or groove for receiving one side of a concavo-convex washer 12. The inclined faces of the recesses 9 coöperate to form a washer seat. The washer 12 is of ring formation, and substantially V-shaped in cross section, as indicated in Fig. 4, having a flat peripheral portion 13, and inwardly-inclined diverging extensions or side members 14, 15, with diverging inner faces and diverging outer faces. From an inspection of Fig. 2 it will be seen that when the heads 2 and 5 are placed together with the washer 12 between them, the side members 14, 15, seat in the respective grooves or recesses 9 of the heads, and the flat peripheral portion 13 extends across the joint of the coupling heads, and acts to seal it. The washer 12 may be of rubber, but any other medium capable of affording a flexible washer may be used, if it will not pucker too much at its edges when a swiveling movement occurs. When the two heads with the washer between them are placed in meeting relation, as shown in Fig. 2, the ends of the cylindrical walls being in juxtaposition; the outer cylindrical faces of the heads terminating at the juxtaposed end faces; and the cylindrical faces substantially alined with each other, the heads are connected by a sleeve 16 having a shouldered portion 17 adapted to engage under the shoulder 6, and a reduced annular portion 18 adapted to rotatably engage a second reduced portion 19 of the head 5. Any suitable means may be employed for securing the sleeve; for this purpose the sleeve 16 is interiorly screw-threaded at its larger end, as indicated at 20, to engage the screw-threads on the head 2, and when screwed home to unite the coupling heads may be held securely in place by means of a screw 21 passed through an aperture in the wall of the sleeve and engaging in the head 2. It is evident that by engaging the cylindrical faces of the coupling heads, the coupling centers the heads upon each other.

From an inspection of Fig. 2 it will be readily seen that the engagement of the walls of the washer 12 in the recesses 9 tends to form a very secure and leak-proof seating of the washer, owing to the engagement of its inner edge and its outer peripheral portion, respectively, with the shoulders 10 and 11; and further that, owing to the open or hollow formation of the washer, the pressure of air, gas or steam passing through the coupling will necessarily be exerted on the inside of the washer and tend to force its peripheral portion and its side walls, outwardly into yet firmer engagement with the recesses in the heads, and thus firmly seal the coupling against leakage. It will be apparent that the greater the pressure exerted upon the washer the firmer it will be forced into engagement with the seats in the heads.

The shouldered portion 6 of the head 5 and the corresponding shouldered portion 17 of the sleeve 16 are finished to form a smooth joint and the coupling member 4 may be readily rotated in the sleeve 16 without in any manner impairing the seal of the coupling. I further provide against leakage at the joint between the shouldered portions 6 and 17 by means of the annular recesses 8, which, as clearly shown by Fig. 2, provide contact surfaces in the opposing faces of the heads 2 and 5 against which the pressure of the air, steam, or other medium will be exerted in operation and tend to force the said heads apart, thereby securing a firm sealing contact between the shoulder 6 and the shoulder 17. Such movement of the coupling member 4, even if continuous, produces very little wear of the washer 12. In course of time, however, the washer must be renewed, and this can easily be accomplished by removing the screw 21 and unscrewing the sleeve from the head 2.

Special attention is called to the beneficial action of the shoulders 10 in tending to prevent the fluid passing through the coupling from getting under the edges of the gasket. This function of the shoulders is very important and I have found in the use of gaskets of this kind that even a very small obstruction, such as a grain of sand under the edge of the gasket may operate to let in the fluid under the gasket, which will then crumple up and become useless. In this connection, one of the advantages of my gasket is its thinness, by reason of which the pressure on the gasket tends to expand it considerably, and this forces its edges well up into the recesses adjacent the shoulders 10.

While I have not illustrated the application of the coupling to the air or steam pipe of a train, I will simply state that in such application it will be necessary to have the coupling members relatively rotatable, and this rotary movement is provided for in my coupling by a simple arrangement which yet preserves the leak-proof character of the coupler.

I claim:

1. A pipe coupling comprising coupling members having two substantially cylindrical walls the ends whereof abut together, said members being held together in rotative relation, the opposing ends of said members being each provided with an enlarged recess surrounding its bore, and with an outer recess surrounding said first-named recess, and an expansible washer interposed between the coupling members and housed in said outer recesses and extending over the joint formed at the abutting ends of said cylindrical walls, said washer being subject to the pressure of the medium passing through the coupling.

2. A pipe coupling comprising coupling members having substantially cylindrical walls the ends whereof abut together, said members being held together in rotative relation, the opposing ends of said coupling members being each provided with an annular recess surrounding its bore, and with an outer inclined recess surrounding said annular recess and terminating at said abutting ends, a washer interposed between the coupling members and having annular side members seated in the respective inclined recesses of the coupling members, said washer having a peripheral portion covering the joint formed at the meeting faces of the coupling members, said washer being subject to the pressure of the medium passing through the coupling, and a sleeve engaging the outer faces of said cylindrical walls and having means for holding said members together.

3. A pipe coupling comprising coupling members having substantially cylindrical walls the end faces whereof are in juxtaposition, the ends of said members having oppositely disposed inclined faces coöperating to form a washer-seat surrounded by said cylindrical walls, an expansible washer of substantially V-shape cross-section having diverging extensions received on said seat, said members having substantially alining outer cylindrical faces terminating at said end faces, a sleeve engaging said cylindrical faces for connecting said members, the pressure of a fluid passing through said coupling operating to force said washer against said seat, said end members having annular shoulders projecting adjacent the edges of the said diverging extensions of said washer to prevent the fluid from forcing itself under said edges.

4. A pipe coupling comprising coupling-members having substantially cylindrical walls the end faces whereof are in juxtaposition, the ends of said members having oppositely disposed inclined faces coöperating to form a washer-seat surrounded by said cylindrical walls, an expansible washer of substantially V-shaped cross section having diverging extensions received on said seat, said members having substantially alining outer cylindrical faces terminating at said end faces, a sleeve engaging said cylindrical faces for connecting said members, the pressure of a fluid passing through said coupling operating to force said washer against said seat, said members having annular shoulders projecting adjacent the edges of said diverging extensions to prevent the fluid passing through said coupling from forcing its way under the edges of said extensions.

5. A pipe coupling comprising coupling members having substantially cylindrical walls the end faces whereof are in juxtaposition, the ends of said members having oppositely disposed inclined faces coöperating to form a washer seat surrounded by said cylindrical walls, an expansible washer of substantially V-shape cross section having diverging extensions received on said seat, said members having outer cylindrical faces terminating at said end faces, a sleeve engaging said cylindrical faces for connecting said members, the pressure of a fluid passing through said coupling operating to force said washer against said seat, the ends of said members having annular shoulders projecting adjacent the edges of the said diverging extensions of said washer to prevent the fluid from forcing itself under said edges.

6. A pipe coupling for conducting a fluid under pressure, comprising coupling members having substantially cylindrical walls the end faces whereof are in juxtaposition, said coupling members each having an inclined annular face extending from the end face of the coupling, said inclined faces coöperating to form a washer-seat surrounded by said cylindrical walls, an expansible concavo-convex washer having diverging inner faces, and diverging outer faces received on said seat, having its inner face exposed to the pressure of the fluid, said coupling members having outer cylindrical faces terminating at said end faces, a sleeve engaging said cylindrical faces for centering and connecting said members, and permitting said coupling members to swivel upon each other, the pressure of the fluid passing through said coupling operating to force said washer against said seat.

In testimony whereof, I have hereunto set my hand.

VOTAW S. DURBIN.